United States Patent
Sheridan et al.

(10) Patent No.: US 6,196,790 B1
(45) Date of Patent: Mar. 6, 2001

(54) SEAL ASSEMBLY FOR AN INTERSHAFT SEAL IN A GAS TURBINE ENGINE

(75) Inventors: William G. Sheridan, Southington; Harold K. Shaffer, Tolland, both of CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/213,686

(22) Filed: Dec. 17, 1998

(51) Int. Cl.$^7$ ............................................. F01D 11/00
(52) U.S. Cl. .................. 415/111; 415/174.2; 415/231
(58) Field of Search ................................. 415/111, 110, 415/230, 231, 174.2, 174.3; 277/368, 379, 390, 401

(56) References Cited

U.S. PATENT DOCUMENTS

| | | | |
|---|---|---|---|
| 3,042,415 | * 7/1962 | Smoll ..................................... | 277/22 |
| 3,623,736 | 11/1971 | Petrie et al. ........................... | 277/27 |
| 3,942,804 | 3/1976 | Andress et al. ....................... | 277/58 |
| 4,377,290 | * 3/1983 | Netzel .................................... | 277/38 |
| 4,500,143 | 2/1985 | Kervistin et al. ..................... | 384/467 |
| 4,501,429 | * 2/1985 | White .................................... | 277/24 |
| 4,752,077 | * 6/1988 | Hoffelner ............................... | 277/22 |
| 4,754,984 | 7/1988 | Keba ..................................... | 277/53 |
| 4,859,526 | 8/1989 | Potepan et al. ....................... | 428/283 |
| 5,088,890 | 2/1992 | Jewess .................................. | 415/112 |
| 5,333,882 | * 8/1994 | Azibert et al. ......................... | 277/1 |
| 5,433,584 | 7/1995 | Amin et al. ........................... | 415/229 |
| 5,464,227 | 11/1995 | Olson ................................... | 277/96.1 |
| 5,605,436 | * 2/1997 | Pedersen ............................. | 415/170.1 |
| 5,622,438 | 4/1997 | Walsh et al. ......................... | 384/624 |

* cited by examiner

*Primary Examiner*—Edward K. Look
*Assistant Examiner*—Ninh Nguyen
(74) *Attorney, Agent, or Firm*—Mark Steinberg

(57) ABSTRACT

A seal assembly for use in an intershaft seal includes a first seal that seals to a seal plate on an inner rotor shaft, a second seal that seals to a seal plate on an outer rotor shaft, and an intermediate seal that is supported by a stator assembly and seals to the first seal and the second seal. The intermediate seal may include a seal segment affixed to the stator assembly, a ring seal between the seal segment and the first seal, and a ring seal between the seal segment and the second seal. An intershaft seal with this seal assembly has less flex than a prior art intershaft seal and thereby results in greater durability and less seal wear.

20 Claims, 4 Drawing Sheets

SEAL ASSEMBLY FOR AN INTERSHAFT SEAL IN A GAS TURBINE ENGINE

DESCRIPTION

1. Technical Field

This invention relates to a seal assembly for a gas turbine engine and more particularly to a seal assembly for an intershaft seal that seals between coaxial rotor shafts in a multiple spool gas turbine engine.

2. Background Art

A front bearing compartment in a multiple spool gas turbine engine is filled with an oil mist to lubricate bearings that support an inner rotor shaft and an outer rotor shaft. The inner and the outer rotor shafts are separated by a gap filled with working medium gas. The working medium gas provides cooling for the rotor shafts, but is warmer than the temperature inside the bearing compartment. An intershaft seal prevents the working medium gas from leaking into the oil compartment and prevents the oil mist from leaking oil out of the compartment into the gap. The intershaft seal traditionally employs two face seals, to seal to the shafts, and a ring seal therebetween, to limit leakage between the face seals.

In order to maximize performance and efficiency, many advanced gas turbine engines operate at very demanding engine conditions, e.g., temperatures, pressures, and rotational speeds. In some of these engines, such conditions sometimes cause the traditional intershaft seals to wear at a rate that is higher than desired. Prior efforts to improve the durability of the seals include using more durable materials and reducing clearances in the seal. These solutions have not eliminated the higher wear rates.

Scientists and engineers working under the direction of Applicants' assignee have been working to provide other solutions to further improve the durability of intershaft seals.

DISCLOSURE OF THE INVENTION

An object of the present invention is to improve the durability of intershaft seals.

The present invention is predicated, in part, on the recognition that flex in the ring seal of the traditional intershaft seal makes the ring seal a primary limiting factor in the durability of the traditional intershaft seal, and that such flex can be eliminated by replacing the traditional ring seal with an intermediate seal supported by the stator assembly to seal between the two face seals.

According to the present invention a seal assembly for use in an intershaft seal includes a first seal that seals to an inner rotor shaft, a second seal that seals to an outer rotor shaft, and an intermediate seal supported by the stator assembly for sealing between the first seal and the second seal.

The seal assembly of the present invention employs an intermediate seal that is supported by the stator assembly to seal between the face seals. Consequently, an intershaft seal employing the seal assembly of the present invention has less flex than the traditional intershaft seal, which results in greater durability and less seal wear than that of the traditional intershaft seal. In a detailed embodiment, the present invention provides these improvements without adding unreasonable complexity or taking up much more room than the traditional intershaft seal, and has a symmetry that facilitates part commonality.

These and other objects, features and advantages of the present invention will become more apparent in the light of the following detailed description, accompanying drawings, and claims.

BEST MODE EMBODIMENT FOR CARRYING OUT THE INVENTION

Figure 1:
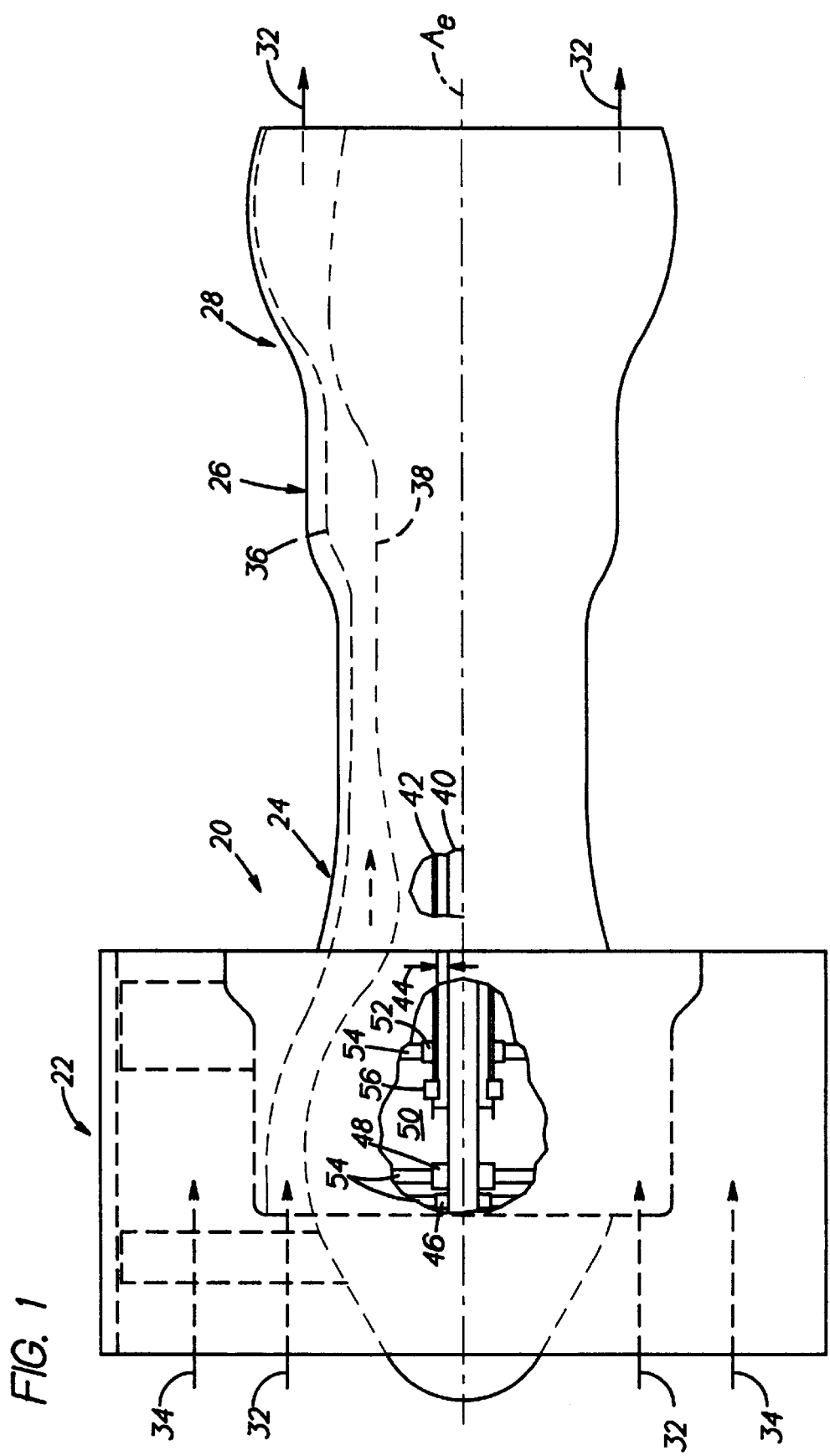
FIG. 1 is schematic representation of a gas turbine aircraft engine, partially broken away to show an inner rotor shaft, an outer rotor shaft, a portion of a concentric front bearing compartment, and an intershaft seal for the front bearing compartment.

The present invention is disclosed herein with respect to an embodiment for use in an intershaft seal for a front bearing compartment of a gas turbine engine 20 represented in FIG. 1.

FIG. 1 is a side elevation view of a turbofan gas turbine engine 20 for powering an aircraft. The engine 20 has a longitudinal axis $A_e$. The engine 20 includes a fan section 22, a compressor section 24, a combustor section 26, and a turbine section 28. An annular flow path 32 for primary working medium gas extends through the sections of the engine 20. A flow path 34 for secondary working medium gas is radially outward of the flow path 32 for primary working medium gas. The flow path 34 for secondary working medium gas extends through the fan section 22 of the engine 20.

The engine 20 has a stator assembly 36 and a rotor assembly 38. The stator assembly 36 extends longitudinally through the engine 20. The rotor assembly 38 includes an inner rotor shaft 40 and an outer rotor shaft 42 which are coaxial and which may be counter-rotating for example, at speeds of about 6000 RPM and 18000 RPM, respectively. The inner rotor shaft 40 and the outer rotor shaft 42 are spaced apart, thereby defining a gap 44. The gap 44 is filled with working medium gas from the compressor section 24, which provides cooling for the rotor shafts.

The inner rotor shaft 40 is supported by a bearing 46 and a bearing 48 located in a front bearing compartment 50. The front bearing compartment 50 further houses a roller bearing 52 to support the outer rotor shaft 42. The bearings are in turn supported by bearing support members 54 extending from the stator assembly 36. The compartment 50 is filled with an oil mist from a suitable source to lubricate and cool the bearings. The working medium gas in the gap 44 is typically much warmer than the temperature inside the front bearing compartment 50.

An intershaft seal 56 prevents the relatively high temperature working medium gas from leaking out of the gap 44 and into the bearing compartment 50. In addition, the intershaft seal 56 prevents the oil mist from leaking out of the bearing compartment 50 and into the gap 44.

Figure 2:
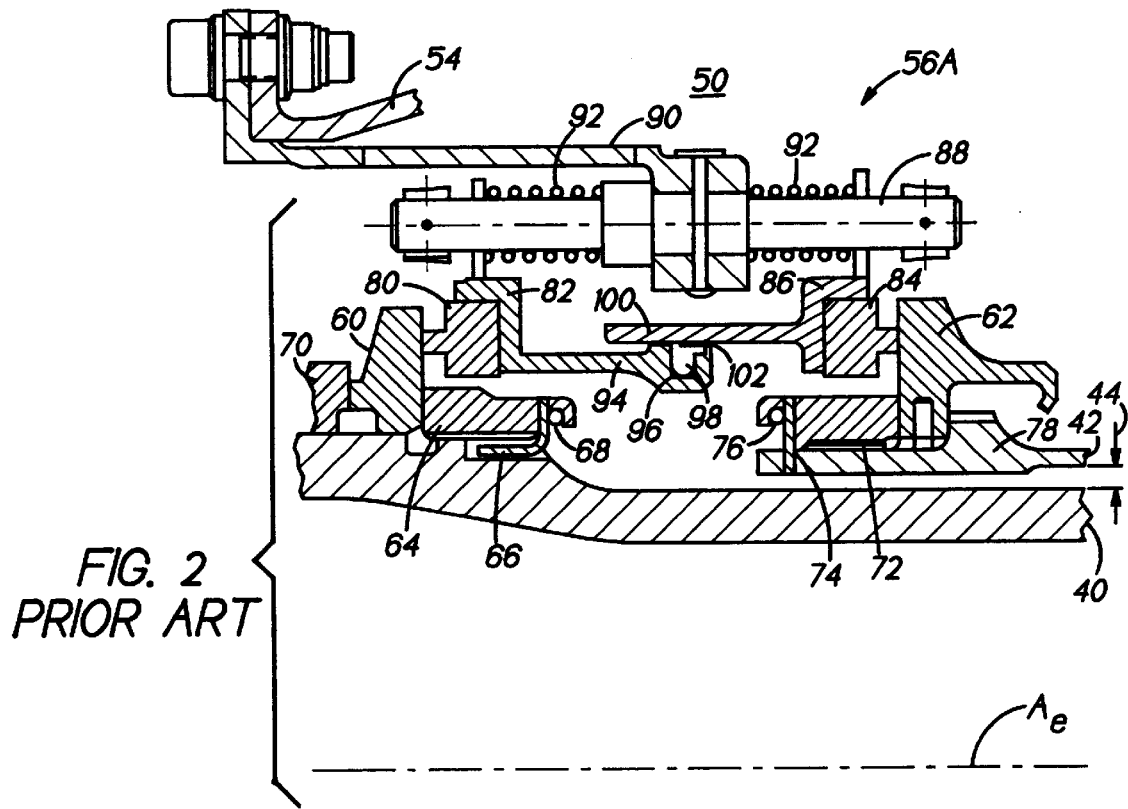
FIG. 2 is a cross sectional view of the inner and outer rotor shafts and a portion of the bearing compartment of FIG. 1, in combination with a cross sectional view of a prior art intershaft seal.

Referring now to FIG. 2, a prior art intershaft seal 56A includes a first annular seal plate 60 extending circumferentially about the inner rotor shaft 40 and a second annular seal plate 62 extending circumferentially about the outer rotor shaft 42. A lock nut 64 retains the first seal plate against an abutment 70 on the inner rotor shaft 40, whereby the first seal plate 60 is carried by and rotates with the inner rotor shaft 40. The lock nut 64 has grooves that receive a lock plate 66 and a locking spring 68 to retain the lock nut 64 to the inner rotor shaft 40. A lock nut 72 retains the second seal plate 62 against an abutment 78 on the outer rotor shaft 42, whereby the second seal plate 62 is carried by and rotates with the outer rotor shaft 42. The lock nut 72 has grooves that receive a lock plate 74 and a locking spring 76 to retain the lock nut 72 to the outer rotor shaft 42.

The prior art intershaft seal 56A further includes a first face seal element 80 and a second face seal element 84, which are radially spaced from and extend circumferentially about the inner rotor shaft 40 and the outer rotor shaft 42, respectively. The first face seal element 80 is supported by a first carrier 82. The second face seal element 84 is supported by a second carrier 86. The first carrier 82 and the second carrier 86 are, in turn, supported by a series of circumferentially spaced pins, represented by a pin 88, that extend through a support shell 90. The support shell 90 is bolted to one of the bearing support members 54 extending from the stator assembly 36. A series of circumferentially spaced coil springs, represented by coil springs 92 (shown in phantom), bias the first carrier 82 and the second carrier 86 longitudinally to maintain light but positive contact between the face seal elements 80, 84 and the seal plates 60, 62, thereby defining face seals.

The first carrier 82 has an extension 94 that extends circumferentially about the inner rotor shaft and longitudinally. The extension 94 has a circumferentially extending recess 96 for a piston ring 98. The second carrier 86 has an extension 100 that extends circumferentially about the outer rotor shaft and longitudinally. The extension 100 has a surface 102 that cooperates with the piston ring 98 to form a ring seal. The ring seal limits leakage between the first carrier 82 and the second carrier 86 yet does not restrict longitudinal motion of the two carbon face seals.

In operation, the two face seals experience longitudinal displacements (motion) due to dimensional variations and axial movement of the rotor shafts. The longitudinal displacements cause the intershaft seal 56A to vibrate. During such displacements and vibration, the extension 94 of the first carrier 82 and the extension 100 of the second carrier 86 provide support and guidance for each other in the area of the ring seal. The ring seal has no other support and guidance.

It has been determined that because the ring seal in the prior art intershaft seal has no support and guidance other than the mutual support and guidance provided by the carriers, there is flex in the ring seal of the traditional intershaft seal that makes the ring seal a primary limiting factor in the durability of the traditional intershaft seal.

Figure 3:
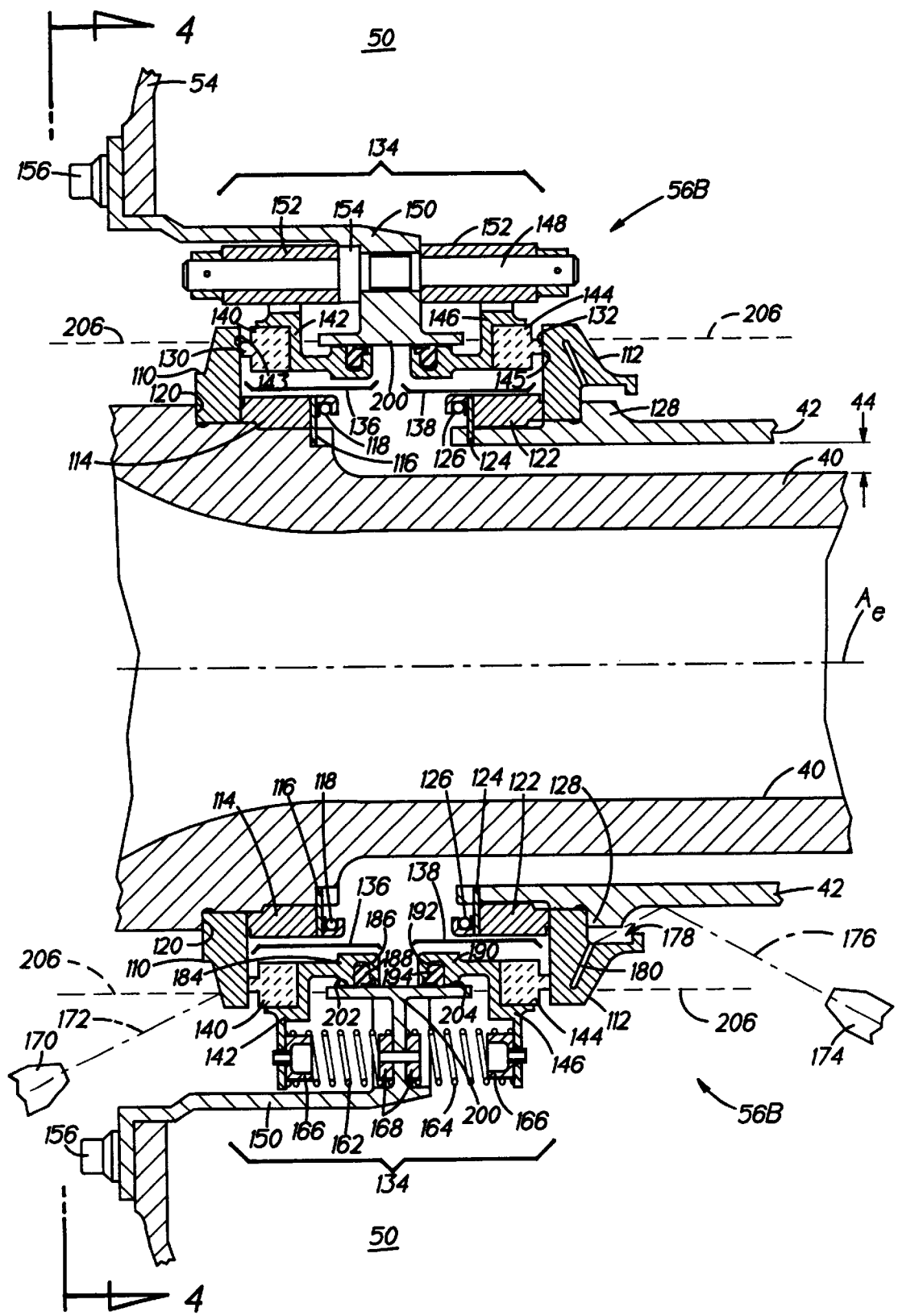
FIG. 3 is a cross sectional view of the inner rotor shaft, the outer rotor shaft and a portion of the bearing compartment of FIG. 1, in combination with a cross sectional view of an intershaft seal assembly according to one embodiment of the present invention.

FIG. 3 is a cross section view of an alternative intershaft seal 56B. Referring now to FIG. 3, the intershaft seal 56B includes a first annular seal plate 110 extending circumferentially about the inner rotor shaft 40 and a second annular seal plate 112 radially spaced from and extending circumferentially about the outer rotor shaft 42. A lock nut 114 retains the first seal plate 110 against an abutment 120 on the inner rotor shaft 40, whereby the first seal plate 110 is carried by and rotates with the inner rotor shaft 40. The lock nut 114 has grooves that receive a lock plate 116 and a locking spring 118 to retain the lock nut 114 to the inner rotor shaft 40. A lock nut 122 retains the second seal plate 112 against an abutment 128 on the outer rotor shaft 42, whereby the second seal plate 112 is carried by and rotates with the outer rotor shaft 42. The lock nut 122 has grooves that receive a lock plate 124 and a locking spring 126 to retain the lock nut 122 to the outer rotor shaft 42 It should be understood that the one or both of the first seal plate and the second seal plates could alternatively be integral to the inner rotor shaft and the outer rotor shaft, respectively. The first seal plate 110 has a sealing surface 130 that extends circumferentially about the inner rotor shaft and radially outward. The second seal plate 112 has a sealing surface 132 that extends circumferentially about the outer rotor shaft and radially outward. The sealing surface 130 of the first seal plate 110 and the sealing surface 132 of the second seal plate 112 define an opening therebetween.

The intershaft seal 56B further includes a seal assembly 134 to seal across the opening. The seal assembly 134 includes a first seal 136 and a second seal 138, which are radially spaced from and extend circumferentially about the inner rotor shaft and the outer rotor shaft, respectively. The first seal 136 has a first face seal element 140 and a first carrier 142. The first face seal element 140 has a sealing surface 143 extending circumferentially about the inner rotor shaft and facing the sealing surface 130 of the first seal plate 110. The second seal 138 has a second face seal element 144 and a second carrier 146. The second face seal element 144 has a sealing surface 145 extending circumferentially about the outer rotor shaft and facing the sealing surface 132 of the second seal plate 112.

The first carrier 142 and the second carrier 146 are supported by a series of circumferentially spaced pins, represented by a pin 148. The pins 148 extend through a support member 150. Sleeves 152 around the pins fill clearances between the pins 148 and the support member 150. Each of the pins 148 has a shoulder 154 that prevents the pin 148 from sliding through the support member 150. The support member 150 does not rotate relative to the stator assembly 36, instead being affixed to the stator assembly 36, for example, by a series of bolts, represented by a bolt 156, that bolt the support member to one of the bearing support members 54 extending from the stator assembly.

A series of circumferentially spaced coil springs, represented by a coil spring 162, bias the first carrier 142 longitudinally to maintain light but positive contact between the first face seal element 140 and the first seal plate 110, thereby defining a first face seal. Another series of circumferentially spaced coil springs, represented by a coil spring 164, bias the second face element carrier longitudinally to maintain light but positive contact between the second face seal element 144 and the second seal plate 112, thereby defining a second face seal. Each of the springs 162, 164 are retained by a cup-like retainer 166 and a disk-like retainer 168. The face seal elements could alternatively be biased by other types of resilient members, for example a wave washer.

The first face seal element 140 and the second face seal element 144 preferably comprise a carbon material. The first carrier 142, the second carrier 146, and the support member 150 preferably comprise a heat treatable steel alloy, e.g., a wrought corrosion resistant steel alloy such as AMS 5613 (i.e., AISI 410 stainless steel).

Each of the face seals may be oil cooled which is well known. A first nozzle 170 sprays an oil jet 172 onto the first face plate 110 to cool the first face seal. A second nozzle 174 sprays an oil jet 176 toward the second face plate 112. The second face plate 112 has a reservoir 178 and a series of passages 180 that provide a flow path from the reservoir 178 to the second face seal. The oil jet flows into the reservoir 178 and through the passages 180 to cool the second face seal.

The first seal 136 further includes an extension 184 that extends circumferentially about the inner rotor shaft and longitudinally. The extension has a circumferentially extending first recess 186. The second seal 138 has an extension 190 that extends circumferentially about the outer rotor shaft and longitudinally. The extension 190 has a circumferentially extending second recess 192.

The seal assembly 134 further includes an intermediate seal. The intermediate seal includes a seal segment 200, a first ring seal element 188, and a second ring seal element 194. The seal segment 200 is radially spaced from and extends circumferentially about the inner rotor shaft 40. The seal segment preferably extends from the first seal 136 to the second seal 138 and is supported by the stator assembly, preferably being affixed to the support member 150. The seal segment 200 and the support member 150 may be affixed by forming them as one piece, or alternatively, formed as separate pieces and then affixed together in any suitable manner, including but not limited to welding and fastening. The seal segment has a first surface 202 and a second surface 204 each of which extends circumferentially about the inner rotor shaft and longitudinally. The first surface 202 and the second surface 204 are preferably disposed on an annular reference surface 206. The first ring seal element 188 extends from the first surface 202 into the first recess 186, thereby forming a first ring seal. The second ring seal element 194 extends from the second surface 204 into the second recess 192, thereby forming a second ring seal. The first and the second ring seals limit leakage between the first seal 136 and the second seal 138 yet do not restrict longitudinal motion of the first seal 136 and the second seal 138.

The first ring seal element 188 and the second ring seal element 194 are preferably of a type selected from a group comprising a piston ring type, a O-ring type, and a C-ring type. The piston ring type preferably comprises cast iron. The O-ring type and the C-ring type may be elastomeric and may comprise non-metallic materials. The size of the first ring seal element 188 and the size of the second ring seal element 194 are selected so as to be circumferentially compressed upon installation in the seal assembly 134, to bias the first and the second ring seal elements toward the first surface 202 and the second surface 204, respectively. The ring seal elements could alternatively be biased toward the surfaces by a separate biasing assembly.

Figure 4:
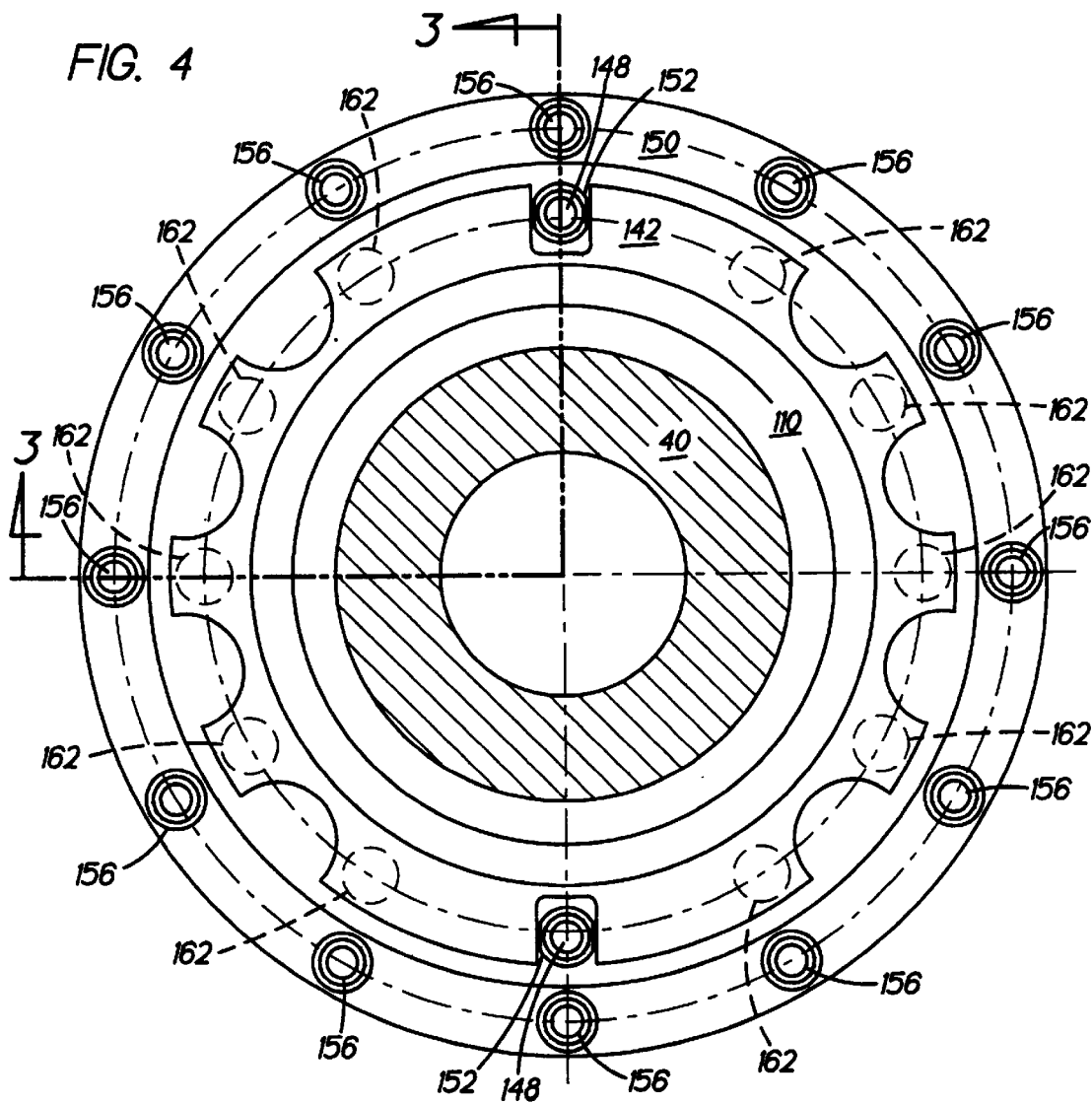
FIG. 4 is a view, in the direction of 4—4 of FIG. 3, of the seal assembly, the second seal plate, and the inner rotor shaft of FIG. 3.

The seal assembly 134 is preferably a replaceable module. FIG. 4 shows an axial view of the seal assembly, the second seal plate 112 and the inner rotor shaft 40.

Unlike the ring seal in the prior art intershaft seal, the ring seals in the present intershaft seal are supported and guided by the seal segment, which is in turn affixed to the stator assembly. Thus, each of the ring seals has greater support and guidance than that of the ring seal of the prior art intershaft seals. The overall result is greater stability and durability, less flex, and less seal wear than in the prior art intershaft seal.

Moreover, the seal assembly of the present invention provides these improvements without the need to add unreasonable complexity. The seal assembly can be implemented with as few as one ring seal more than that of a prior art intershaft seal. Furthermore, because the seal segment seals to both the first seal and the second seal, the number of references and the tolerance stack up can also be kept reasonable.

In addition, although not limited to such, an intershaft seal employing the seal assembly of the present invention may have symmetry, which facilitates part commonality, and may not take up much more room than the prior art intershaft seal. For example, the first seal plate 110 may be the same as the second seal plate 112. The first face seal element 140 may be the same as the second face seal element 144. The first carrier 142 may be the same as the second carrier 146. The first ring seal element may be the same as the second ring seal element.

Although disclosed with respect to an embodiment having recesses in the extensions of the carriers, and having surfaces on the seal segment, the present invention is not limited to such. For example, an alternative embodiment has carriers with surfaces and has a seal segment with recesses for ring seal elements. Furthermore, although the seal segment is shown radially outward of the first seal 136 and the second seal 138, the seal segment may alternatively be radially inward of the first seal 136 and the second seal 138. The seal segment need not have a cylindrical shape. Moreover, the first surface and the second surface may be radially offset from one another, i.e. the first surface and the second surface need not lie on the same annular reference surface.

Futhermore, although disclosed with respect to a best mode embodiment in which the first and the second seals are radially outward of the inner rotor shaft and the outer rotor shafts, respectively, the present invention is not limited to such. As stated above, the first seal and the second seal extend circumferentially about the inner rotor shaft and the outer rotor shafts, respectively. Thus, for example, the first and the second seals may extend about an outer, a middle, or an inner circumference of the respective rotor shaft. In the latter instance, one or both of the first and the second seals may be radially inward of the respective rotor shaft. As a further example, one or both of the first and the second seals may be on an end of the respective rotor shaft.

In addition, although disclosed with respect to a best mode embodiment in which the first seal and the second seal to the inner rotor shaft and the outer rotor shaft, respectively, by sealing to the first and the second seal plates on the inner and the outer rotor shafts, the present invention is not limited to such. All that the present invention requires is a first seal that seals to the inner rotor shaft, a second seal that seals to the outer rotor shaft, and an intermediate seal supported by the stator assembly that seals between the first seal and the second seal. For example, in other embodiments, one or both of the first seal and the second seal may seal directly to the respective rotor shaft. In such embodiment, the first and the second seals need not be face seals but rather may be any type of seal including but not limited to labyrinth and ring types. In another embodiment, one or both of the first seal and the second seal may seal to a structure that is carried by or integral to the respective rotor shaft but has a different shape than that of the seal plates described above.

Although the present invention has been described with reference to a best mode embodiment, this description is not meant to be construed in a limiting sense. Various modifications of the best mode embodiment, as well as additional embodiments of the invention, will be apparent to persons skilled in the art upon reference to this description, without departing from the spirit of the invention, as recited in the claims appended hereto. It is therefore contemplated that the appended claims will cover any such modifications or embodiments as fall within the true scope of the invention.

What is claimed is:

1. A seal assembly for use in a gas turbine engine having a stator assembly that provides support for an inner rotor shaft and an outer rotor shaft, the inner rotor shaft being coaxial with and spaced radially inward of the outer rotor shaft, the inner rotor shaft and the outer rotor shaft being rotatable relative to the stator assembly, the seal assembly comprising:

a first seal that extends circumferentially about the inner rotor shaft and seals said stator to the inner rotor shaft;

a second seal that extends circumferentially about the outer rotor shaft and seals said stator to the outer rotor shaft; and an intermediate seal comprising a seal segment that extends circumferentially about the inner rotor shaft and is supported by the stator assembly, and seals the space between said shafts by sealing to the first seal and the second seal independently of one another.

2. The seal assembly of claim 1 further comprising a support member radially spaced from and extending circumferentially about the inner rotor shaft and affixable to the stator assembly, and wherein the intermediate seal is affixed to the support member.

3. The seal assembly of claim 2 wherein the intermediate seal comprises:

a seal segment radially spaced from and extending circumferentially about the inner rotor shaft and supported by the stator assembly;

a first ring seal element extending radially from the first seal to the seal segment to form a ring seal; and a second ring seal element extending radially from the second seal to the seal segment to form a ring seal.

4. The seal assembly of claim 3 wherein the first seal comprises a first face seal element and a first carrier that supports the first face seal element, the second seal comprises a second face seal element and a second carrier that supports the second face seal element, the first seal element carrier has an extension extending circumferentially and longitudinally, the second seal element carrier has an extension extending circumferentially and longitudinally, and the intermediate seal extends between the extension of the first seal element carrier and the extension of the second seal element carrier.

5. The seal assembly of claim 4 wherein one of the first seal and the seal segment has a circumferentially extending first recess, the other of the first seal and the seal segment has a first surface extending circumferentially and longitudinally, the first ring seal element extends from the first surface into the first recess, one of the second seal and the seal segment has a circumferentially extending second recess, the other of the second seal and the seal segment has a second surface extending circumferentially and longitudinally, and the second ring seal element extends from the second surface into the second recess.

6. The seal assembly of claim 5 wherein the first seal has the first recess, the second seal has the second recess, and the seal segment has the first surface and the second surface.

7. The seal assembly of claim 5 wherein the first surface and the second surface lie on an annular reference surface.

8. The seal assembly of claim 3 wherein one of the first seal and the seal segment has a circumferentially extending first recess, the other of the first seal and the seal segment has a first surface extending circumferentially and longitudinally, the first ring seal element extends from the first surface into the first recess, one of the second seal and the seal segment has a circumferentially extending second recess, the other of the second seal and the seal segment has a second surface extending circumferentially and longitudinally, and the second ring seal element extends from the second surface into the second recess.

9. The seal assembly of claim 8 wherein the first seal has the first recess, the second seal has the second recess, and the seal segment has the first surface and the second surface.

10. The seal assembly of claim 8 wherein the first surface and the second surface lie on an annular reference surface.

11. The seal assembly of claim 2 wherein the first seal comprises a first face seal element and a first carrier that supports the first face seal element, the second seal comprises a second face seal element and a second carrier that supports the second face seal element, the first seal element carrier has an extension extending circumferentially and longitudinally, the second seal element carrier has an extension extending circumferentially and longitudinally, and the intermediate seal extends between the extension of the first seal element carrier and the extension of the second seal element carrier.

12. The seal assembly of claim 1 wherein said seal segment is radially spaced from and extends circumferentially about the inner rotor shaft and is supported by the stator assembly and said intermediate seal comprises:

a first ring seal element extending radially from the first seal to the seal segment to form a ring seal; and a second ring seal element extending radially from the second seal to the seal segment to form a ring seal.

13. The seal assembly of claim 12 wherein the first seal comprises a first face seal element and a first carrier that supports the first face seal element, the second seal comprises a second face seal element and a second carrier that supports the second face seal element, the first seal element carrier has an extension extending circumferentially and longitudinally, the second seal element carrier has an extension extending circumferentially and longitudinally, and the intermediate seal extends between the extension of the first seal element carrier and the extension of the second seal element carrier.

14. The seal assembly of claim 13 wherein one of the first seal and the seal segment has a circumferentially extending first recess, the other of the first seal and the seal segment has a first surface extending circumferentially and longitudinally, the first ring seal element extends from the first surface into the first recess, one of the second seal and the seal segment has a circumferentially extending second recess, the other of the second seal and the seal segment has a second surface extending circumferentially and longitudinally, and the second ring seal element extends from the second surface into the second recess.

15. The seal assembly of claim 14 wherein the first seal has the first recess, the second seal has the second recess, and the seal segment has the first surface and the second surface.

16. The seal assembly of claim 14 wherein the first surface and the second surface lie on an annular reference surface.

17. The seal assembly of claim 12 wherein one of the first seal and the seal segment has a circumferentially extending first recess, the other of the first seal and the seal segment has a first surface extending circumferentially and longitudinally, the first ring seal element extends from the first surface into the first recess, one of the second seal and the seal segment has a circumferentially extending second recess, the other of the second seal and the seal segment has a second surface extending circumferentially and longitudinally, and the second ring seal element extends from the second surface into the second recess.

18. The seal assembly of claim 17 wherein the first seal has the first recess, the second seal has the second recess, and the seal segment has the first surface and the second surface.

19. The seal assembly of claim 17 wherein the first surface and the second surface lie on an annular reference surface.

20. The seal assembly of claim 1 wherein the first seal comprises a first face seal element and a first carrier that supports the first face seal element, the second seal comprises a second face seal element and a second carrier that supports the second face seal element, the first seal element carrier has an extension extending circumferentially and longitudinally, the second seal element carrier has an extension extending circumferentially and longitudinally, and the intermediate seal extends between the extension of the first seal element carrier and the extension of the second seal element carrier.

\* \* \* \* \*